July 9, 1957  F. BRODSKY  2,798,293
AUTOMATIC SLICER FOR BARS OF BUTTER OR THE LIKE
Filed Dec. 17, 1953  2 Sheets-Sheet 1
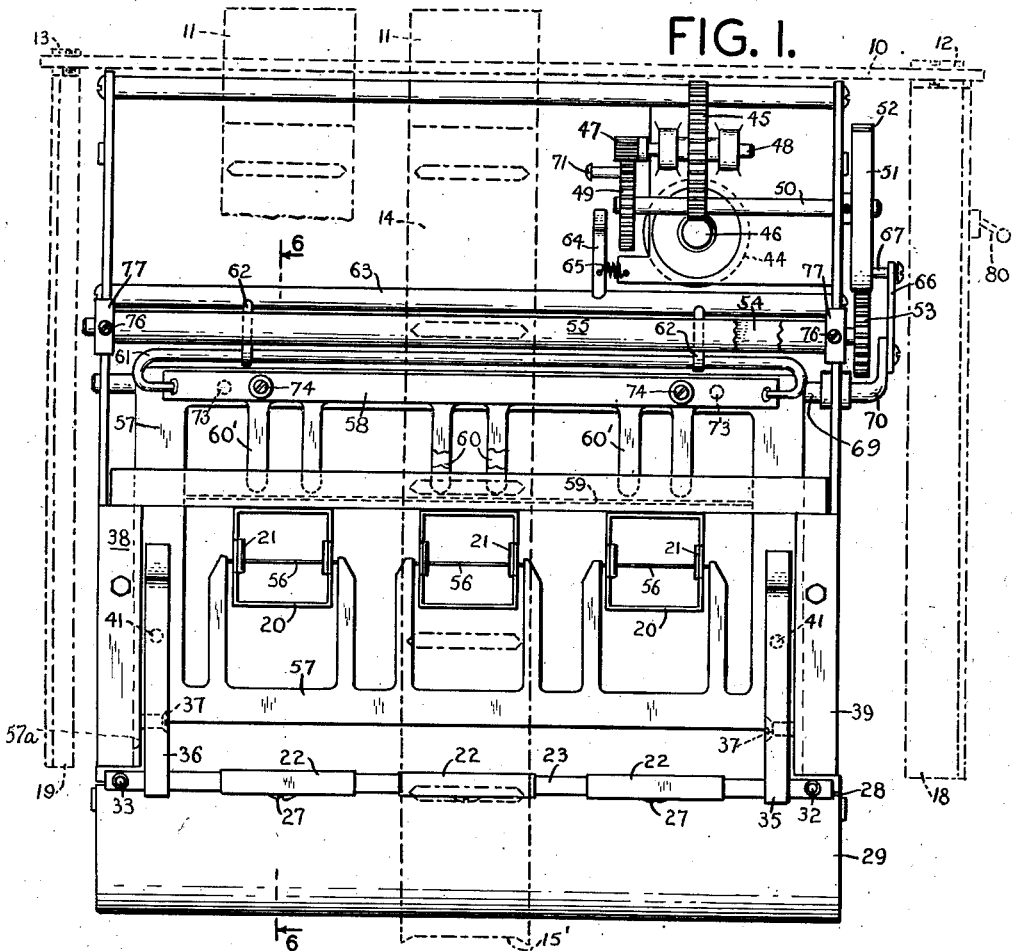
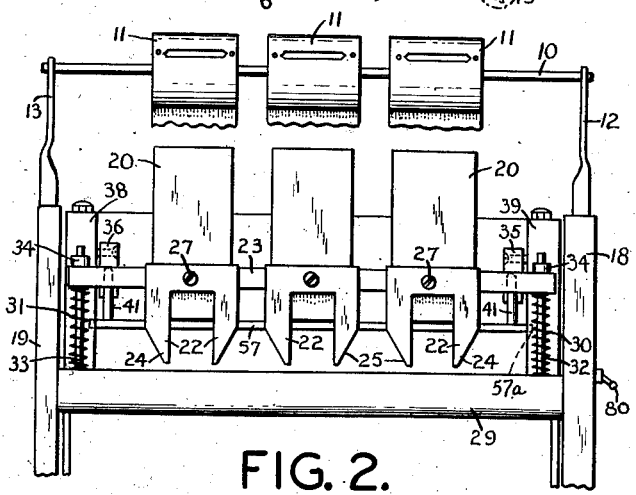
INVENTOR
FRANK BRODSKY
BY
ATTORNEY July 9, 1957 F. BRODSKY 2,798,293
AUTOMATIC SLICER FOR BARS OF BUTTER OR THE LIKE
Filed Dec. 17, 1953 2 Sheets-Sheet 2

INVENTOR
FRANK BRODSKY
BY
ATTORNEY

United States Patent Office 2,798,293
Patented July 9, 1957

2,798,293
AUTOMATIC SLICER FOR BARS OF BUTTER OR THE LIKE

Frank Brodsky, Brooklyn, N. Y.

Application December 17, 1953, Serial No. 398,801

1 Claim. (Cl. 31—6)

The present invention concerns a novel machine for effecting automatic slicing of bars of butter or the like, and depositing the slices on individual serving trays formed simultaneously with the slicing of the bars.

The need has long existed for a device which can be used in restaurants, hotels and wherever many meals are served, to cut standard quarter pound bars of butter, oleo margarine, and the like into individual pats and to deposit the pats on individual serving trays, automatically, efficiently, and in a sanitary fashion.

At present butter bars are cut by hand by multiple blade or wire cutters into pats and the several pats are then placed on individual serving trays. These hand operations are wasteful of time and material, and not wholly sanitary.

The present invention is directed toward overcoming the many disadvantages inherent in the above mentioned hand operations by providing a machine which can be loaded simultaneously with a plurality of bars of butter, oleo margarine, or the like. On being set in operation, the bars are automatically and progressively advanced through chutes in the machine. Wire elements cut the bars into individual slices or pats and separate them from the uncut portions of the bars. The pats are deposited on strips of stiff paper disposed beneath the chutes. The strips are fed from rolls carried in the machine. At spaced intervals along the strips spaces are provided for depositing of the pats. Between the spaces are elongated apertures into which cutters descend after the pats are deposited on the strips and moved out from under the chutes to sever the strips into individual serving trays each carrying a single pat of butter or the like.

It is therefore a principal object of the invention to provide a machine for automatically slicing bars of butter or the like into pats or slices of predetermined size.

It is a further object to provide a machine for automatically slicing bars of butter or the like into pats, depositing the pats on a strip of paper and severing the strip to form individual serving trays of pats of the sliced material.

It is a further object to provide a novel paper strip preformed to be severed into individual trays for pats of butter or the like.

Other and further objects and advantages will become apparent from the following description taken together with the drawing. It should be first noted that wherever bars or pats of butter are referred to herein, it is not intended to limit the reference to butter. The invention is equally applicable to be used for slicing oleo margarine, cheese, ice cream, bananas, candy, hors d'oeuvres and many other types of sliceable foodstuffs. The invention can be used further for sliceable materials other than foodstuffs such as bars of wax, gum etc. The invention may be used also for slicing many sliceable pharmaceuticals of various kinds. For convenience in description, the term "butter" is used hereafter but is intended to apply with equal force and weight to all sliceable material having a consistency or sliceability comparable with that of butter whether a foodstuff or not.

In the drawing:

Fig. 1 is a plan view of a machine embodying the invention.

Fig. 2 is a front elevational view of certain parts of the machine of Fig. 1.

Fig. 3 shows a portion of a paper strip preformed for severance into individual trays according to the invention.

Figure 4:
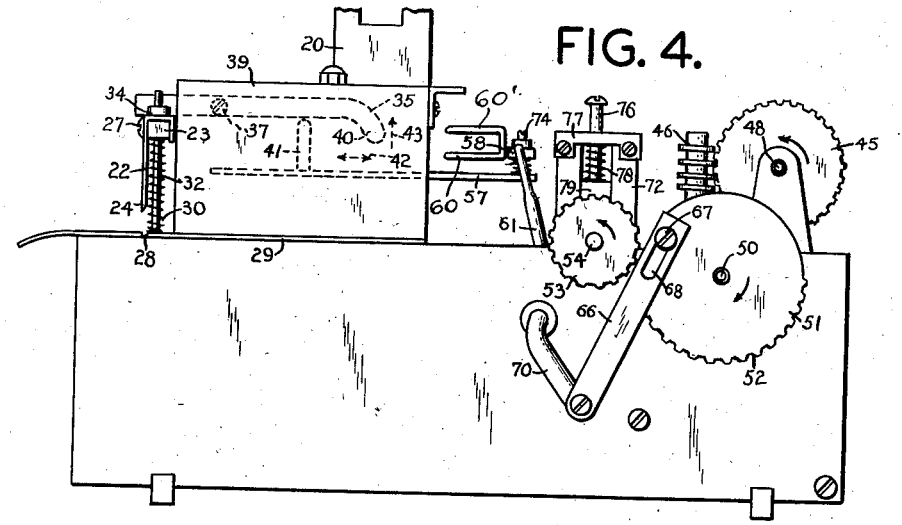
Fig. 4 is a side view of the machine of Fig. 1 showing certain mechanical details.

In Figs. 1 and 2 are shown a bar 10 which supports a plurality of rolls 11 of stiff paper. The bar 10 is carried by frame members 12, 13 and is readily removable therefrom for loading with rolls of paper. The paper is coiled in rolls 11. As best shown in Fig. 3, the paper is in the form of a strip 14 and is perforated with elongated apertures 15 and small round apertures 16 at equally spaced intervals along the strip. A substantially rectangular area 17 is marked off by crease lines between each pair of apertures. It is in this area that the butter pat is deposited as will be described. The frame members 12, 13 are supported by the outer side pieces 18, 19. Within the machine are located chutes 20. Three chutes are shown but more or less than three chutes may be provided as needed. The chutes are each substantially square or rectangular in cross-section and disposed vertically to receive a standard quarter pound bar of butter or the like. A pair of inwardly curved spring leaves or blades 21 is mounted inside each chute to exert a gentle pressure on the sides of the butter bar and hold it vertical as it is being cut.

A paper cutter 22 is disposed in front of each chute and mounted on cutter holder 23. Each cutter has a pair of cutting blades 24 inwardly tapered with the tapered edges 25 sharpened. The spacing of the lower tips of the cutting blades is less than the length of the elongated aperture 15 in the paper strip so that the cutter enters the aperture easily. The outer and upper points of the cutting edges 25 are spaced apart a distance greater than the length of apertures 15. Thus in entering the apertures 15 the cutters readily sever the uncut sides 26 of the paper strip. Suitable screws 27 support the cutters 22 on cutter holder 23. A slot 28 is provided in table 29 of the machine into which the cutter blades 24 enter while severing the paper strips. Cutter holder 23 is subject to an up and down or vertically reciprocating motion. In order to accomplish this motion the holder 23 is supported on springs 30, 31 and rides on shafts 32, 33. Nuts 34 secured near the tops of shafts 32, 33 limit the upward movement of the cutter holder.

In Fig. 4 is best shown the mechanism for operating the cutters 22. A pair of cam levers 35, 36 carried by stationary pivots 37 have their outer ends resting on cutter holder 23. Pivots 37 are lodged in the stationary frame members 38, 39 shown in Fig. 2. The cam levers 35, 36 have downwardly inclined inner ends 40. A movable upstanding pin 41 is provided to move inwardly as shown by arrow 42 and actuate each cam lever. In slipping along the curved ends 40 of the cam levers, the pins 41 tip the curved ends upwardly as shown by arrow 43. The outer ends of lever 35, 36 move downwardly pressing the cutter holder 23 down to effect the cutting operation of the paper strips. Pins 41 are supported on frame plate 57 forming part of a mechanism driven by motor 44 now to be described.

In Figs. 1 and 4 are shown the worm gear 45 continuously driven by motor 44. This is done indirectly, since the motor 44 drives a worm 46 which engages and drives the worm wheel or gear 45. Pinion 47 is mounted on the same shaft 48 as gear 45 and rotates with it. Pinion 47 drives gear 49 carried by shaft 50. Shaft 50 carries gear 51 which has teeth 52 disposed over not more than one half of the perimeter of gear 51. Gear 51 rotates continuously and periodically engages gear 53. Gear 53 is carried by roller shaft 54. Roller shaft 54 is mounted on the machine frame adjacent to idler roller 55 as shown best in Fig. 5. The several strips of paper are threaded from rolls 11 between rollers 54, 55 and then down underneath the chutes 20 as shown in Fig. 1 to come out horizontally on table 29.

In order to effect cutting and progressive feeding of the butter bars, a cutter carrier frame plate 57 is mounted for horizontal forward and rearward slidable movement in opposed grooves 57a formed in stationary frame members 38 and 39. Cutter wires 56 are carried by rearwardly projecting arms 56a and it will be noted in Fig. 1 that these arms are spaced sufficiently apart to receive the chutes 20 between them. The horizontal plane which frame plate 57 travels is immediately below the lower end of chutes 20. See Fig. 6. When said frame plate moves rearwardly the cutter wires cut through those portions of the cutter bars which project downwardly from the chutes and butter slices are thereby severed from the butter bars. A separator wire 59 extends transversely of the machine to assist in separating the butter slices from the butter bars.

Supported on the back end of frame plate 57 behind the chutes 20 is a transverse bar 58. Bar 58 is mounted for vertical movement on said frame plate by being loosely impaled at its ends on pins 74 which are secured to the frame plate 57. Compression springs 75 are also mounted on said pins between the frame plate 57 and bar 58 and they tend to support said bar in elevated position. Heads are provided on said pins to prevent dislodgement of said bar 58. Bar 58 carries a plurality of flat feeder blades 60 and 60'. As Fig. 6 clearly shows, blades 60' are disposed in a common horizontal plane above blades 60 which are also disposed in a common horizontal plane. The distance between the two sets of blades may be equal to the thickness of a pat or slice of butter. Two sets of blades are provided rather than only one set since the lower set engages those bars of butter which have been sliced almost completely and the upper set engages replacement bars of butter which are inserted into the chutes on top of the sliced bars. The two sets of blades tend to lock the new and sliced bars of butter together.

Figure 5:
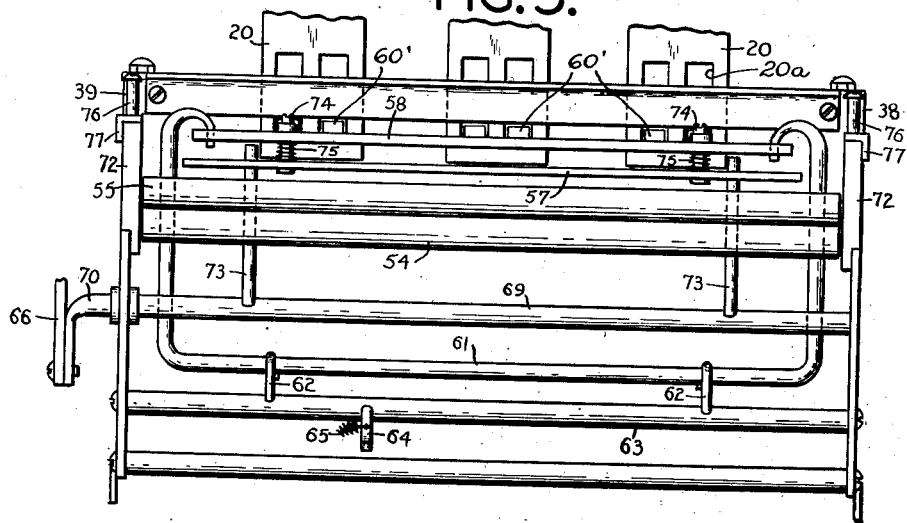
Fig. 5 is a rear view of part of the machine of Fig. 1 showing certain mechanical details.
Figure 6:
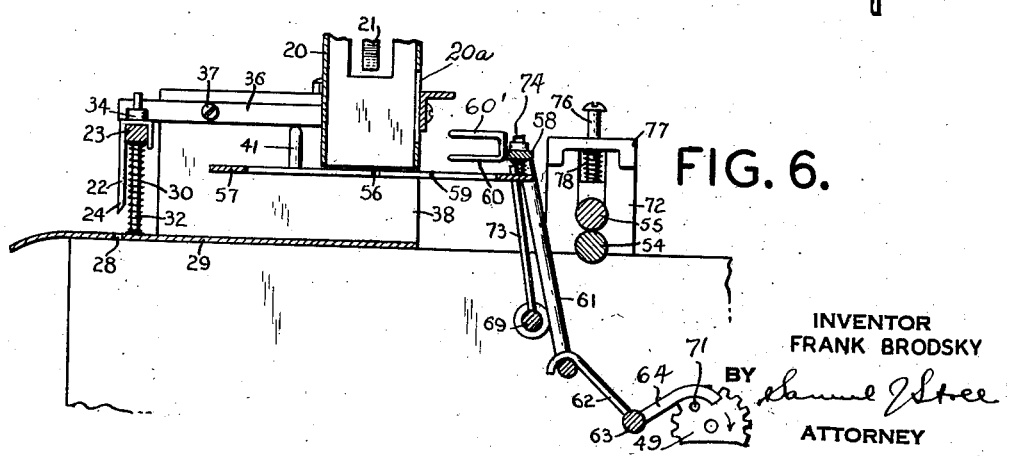
Fig. 6 is a sectional view taken on lines 6—6 of Fig. 1.

It is the horizontal movement of the frame plate 57 which brings the feeder blades 60 and 60' into and out of engagement with the butter through openings 20a in the back walls of the chutes. The movement which the frame plate thus imparts to the feeder blades is a horizontal movement but it will be understood that in order to feed the butter downwardly after these blades engage it, they must be made to move downwardly through said openings 20a. The means for accomplishing this vertical movement is best shown in Figs. 4, 5 and 6. Bar 58 which supports the feeder blades is engaged at its ends by the U-shaped double hook member 61. Double hook member 61 is engaged at its yoke by a pair of hooks 62 which are secured to a shaft 63. Shaft 63 carries a hooked arm 64 which is biased by spring 65. An eccentrically disposed pin 71 projects outwardly from gear wheel 49 and periodically as said gear wheel rotates, said pin 71 engages hook-shaped arm 64 against the action of spring 65 and causes angular movement of the shaft 63 to which said hooked arm is attached. As shaft 63 is thereby caused to engage in angular movement, it causes hooks 62 to pull downwardly upon double hooked member 61 which, being hooked to the bar 58, causes downward movement of said bar against the action of springs 75 and corresponding downward movement of the two sets of feeder blades 60 and 60' in order to advance the bars of butter downwardly to the extent of the thickness of a single pat or slice of butter.

A bar 66 is engaged with the continuously rotatable gear 51 by means of pin 67. A slot 68 in bar 66 allows for a certain amount of adjustment of position of bar 66. Bar 66 is attached to a crank portion 70 of a movable shaft 69. Shaft 69 turns to a limited extent in the frame members 38, 39 of the machine. To shaft 69 are attached pins 73 having narrowed ends, shown best in Fig. 4, and passing through apertures in cutter frame plate 57. Pins 73 move plate 57 forwardly when shaft 69 turns in counterclockwise direction as viewed in Fig. 6. When shaft 69 turns in clockwise direction as viewed in Fig. 6, the cutter frame plate 57 is moved rearwardly to its inoperative position. When cutter frame plate 57 is thus retracted to its rearward position, it moves pins 41 which it carries into contact with ends 40 of cam levers 35, 36. Plate 57 and bar 58 are connected by adjustable, headed pins 74 and spaced by springs 75. Screws 76 are threaded in crossbars 77 supported on roller housings 72. These screws pass through springs 78 which carry roller contact elements 79. The contact elements 79 bear down on roller 55 to control the contact pressure between rollers 54 and 55 through which the paper strips are threaded. A switch 80 is provided to turn motor 44 on or off as required. Motor 44 is connected to a suitable power source.

The sequence of operation of the parts of the machine described above may be best summarized under the following headings:

1. Slicing and feeding of bars
2. Cutting of paper
3. Feeding of paper

1. Slicing and feeding of bars

To slice a bar, the plate 57 must be moved forwardly. This is done by the pins 73 which are moved on shaft 69. Shaft 69 is moved by bar 66 which is periodically moved forward by the continuously rotating gear 51. Gear 51 is kept continuously rotating via the gear train consisting of gear 49, pinion 47, gear 45 and worm 46 driven by motor 44. When the plate 57 moves forwardly the cutter wires 66 first cut individual pats from the bars of butter. Then wire 59 separates the pats from the bars causing the pats to drop in the chutes to the paper strips disposed beneath the chutes. As plate 57 continues to advance the feeder blades 60 enter the bars of butter just above the freshly cut surface. Bar 58 is now coused to move downwardly on pins 74 and this causes the blades 60 and 60' to draw the butter bars downwardly a distance equal to the thickness of one pat. The cutter frame plate 57 now retracts and bar 58 moves upwardly to its original position.

2. Cutting of paper

The paper is periodically cut by cutters 22 almost at the same time as the butter pats are cut and deposited on the areas 17 of the paper strips beneath the chutes. The cutters 22 move downwardly when camming levers 35, 36 bear down on cutter holder 23. The camming levers are actuated only during the backward movement of plate 57 which carries pins 41 into slipping contact with the downwardly inclined ends 40 of the levers 35, 36. During the forward movement of plate 57 and pins 41, the levers 35, 36 are restored to their original positions by compressed springs 30, 31 which lift the cutter holder 23 and cutters 22.

3. Feeding of paper

Paper is drawn from the rolls 11 periodically only while the teeth 52 of gear 51 engage the gear 53. As clearly shown in Fig. 4 this occurs during only a portion of the rotational period of gear 51 and precedes the cutting off of a tray of butter. The paper is quite stiff so that rotation of rollers 54, 55 is sufficient to draw paper off the roll 11 and push it past the chute carrying a slice or pat of butter or the like on the end thereof. Roller 54 carries gear 53 so that the periodic movement of gear 53 by gear 51 effects the feeding of a predetermined length of paper under the chute periodically to pass a loaded tray outside the chute where the paper is cut and tray released almost simultaneously with deposit of the next pat on the succeeding area 17 on the paper strip.

The operation of the machine is clearly cyclical, that is the bar is sliced and loaded on trays repetitively until the bar is all sliced. The sequence of operation may be taken as starting with a butter bar loaded in a chute 20, and motor 44 turned on by operation of switch 80. The cutting operation begins by forward movement of the wire cutter carrier plate 57 so that wires 56 first sever the cutter. Plate 57 continues to move forward so that the separator wire opens a space between the cut pat and the uncut butter. Blades 60 then enter the bar just above the cut surface and draw the bar down to the proper position for the next cut while the cut pat drops down on the paper strip 14 into the area 17. The paper strip is then fed forwardly. Cutter 22 descends when the cut pat is outside the chute to sever sides 26 of the paper strip, while the cutter wires and blades are retracted. Cutter 22 is then raised and permits a new length of paper carrying a pat to be pushed from beneath the chute. The cut end of the butter tray has as part of one side one wall 15' of aperture 15 as shown in Fig. 1.

The operation of the machine is regarded as substantially automatic since it is only required that the operator load butter bars into the chutes either before turning the motor on or while it is in operation. The sliced pats of butter will appear loaded on individual trays at the outer end of table 29. Table 29 is curved downwardly slightly at its outer end so that each successive tray of butter or the like will push the preceding tray off the table into a suitable container held beneath the table, or the operator can pick the successive trays directly off the table 29, or if desired, the tray of butter will slide off the end of the table by itself as soon as the strip of paper is cut.

Although only a single preferred embodiment of the invention has been described it will be obvious to those skilled in the art that many variations are possible without departing from the spirit of the invention as defined in the appended claim.

I claim:

An automatic butter slicer and dispenser, comprising a stationary frame, a roller mounted on said stationary frame and adapted to support a plurality of paper rolls, each of said rolls consisting of a continuous paper strip having transverse slits formed therein in spaced relation to each other, thereby defining butter pat receiving areas between them, a pair of cooperative feed rollers adapted to receive the paper strips from said rolls and to feed them forwardly across said stationary frame, a plurality of vertically reciprocatory movable paper cutters mounted on said stationary frame above said paper strips, said paper cutters having tapered cutting edges which are adapted to be inserted into the transverse slits in said paper strips and to sever said paper strips along their lines of juncture at the ends of said slits, drive means connected to said feed rollers and causing them to engage in intermittent angular movement, a frame plate mounted in the stationary frame for horizontal slidable movement forwardly and rearwardly therein, said frame plate being also connected to said drive means and being thereby caused to engage in intermittent forward and rearward movement, a pair of cam members pivotally supported on the stationary frame for pivotal movement about a common transverse horizontal axis, one end of said cam members being connected to said paper cutters, cam engaging members mounted on said frame plate for engagement with said cam members, whereby rearward movement of said frame plate causes said cam engaging members to pivot the cam members and to move the paper cutters downwardly into engagement with the paper strips in order to sever them at their respective transverse slits into individual paper trays adapted to receive individual pats of butter, spring means operatively associated with said cam members and causing them to pivot back to their original positions when the frame plate and the cam engaging members move forwardly, thereby retracting the paper cutters in upward direction, a plurality of chutes mounted on said stationary frame above the frame plate, one chute for each paper strip, said chutes being disposed vertically in side-by-side relationship transversely of the stationary frame, each chute being positioned immediately behind one of said paper cutters, said chutes being adapted to receive bars of butter which are to be cut up into individual pats of butter and to be deposited on said individual paper trays, a plurality of rearwardly extending arms supported at the forward end of said frame plate in a common horizontal plane below said chutes, two such arms on opposite sides of each chute, butter cutting wires secured to the free ends of said arms, one such wire for each chute, whereby rearward horizontal movement of the frame plate brings said butter cutting wires into engagement with the butter bars and severs said butter bars into individual butter pats, and butter feed means comprising a plurality of forwardly extending horizontal blades mounted on a transverse bar supported on the rear of the frame plate, said transverse bar being movable integrally with said frame plate forwardly and rearwardly therewith, openings in the back walls of the chutes to permit entry of said blades into the chutes and into engagement with the butter bars therein when the frame plate moves forwardly, said transverse bar being vetrically movable on said frame plate both upwardly and downwardly relative to the frame plate, spring means disposed between said frame plate and said transverse bar and urging said bar, together with the blades projecting therefrom, upwardly, an eccentric operatively connected to said drive means, a linkage operatively connected between said eccentric and said transverse bar for depressing the bar against the action of said last mentioned spring means in order to move the blades downwardly, whereby the butter bars are fed downwardly in their respective chutes so as to be engageable by the butter cutting wires on rearward movement of the frame plate.

References Cited in the file of this patent
UNITED STATES PATENTS

| | | |
|---|---|---|
| 1,171,439 | Hren | Feb. 15, 1916 |
| 2,019,002 | Drohmann et al. | Oct. 29, 1935 |
| 2,293,054 | Freedman | Aug. 18, 1942 |
| 2,299,314 | Elesh et al. | Oct. 20, 1942 |
| 2,430,209 | Boegner | Nov. 4, 1947 |
| 2,491,807 | Freedman | Dec. 20, 1949 |
| 2,529,850 | Scharsch | Nov. 14, 1950 |
| 2,718,701 | Fromwiller | Sept. 27, 1955 |